US010487956B2

(12) United States Patent
Meyer et al.

(10) Patent No.: US 10,487,956 B2
(45) Date of Patent: Nov. 26, 2019

(54) VALVE ASSEMBLY

(71) Applicant: Insight Technical Services, Inc., Johnstown, CO (US)

(72) Inventors: Clark Meyer, Mead, CO (US); Vern Mauzy, Thornton, CO (US)

(73) Assignee: Insight Technical Services, Inc., Johnstown, CO (US)

( * ) Notice: Subject to any disclaimer, the term of this patent is extended or adjusted under 35 U.S.C. 154(b) by 0 days.

(21) Appl. No.: 15/617,984

(22) Filed: Jun. 8, 2017

(65) Prior Publication Data

US 2017/0356564 A1 Dec. 14, 2017

Related U.S. Application Data

(60) Provisional application No. 62/347,918, filed on Jun. 9, 2016.

(51) Int. Cl.
*F16K 27/06* (2006.01)
*F16K 31/50* (2006.01)

(52) U.S. Cl.
CPC .......... *F16K 27/067* (2013.01); *F16K 31/502* (2013.01); *F16K 31/508* (2013.01); *Y10T 137/0508* (2015.04); *Y10T 137/0519* (2015.04); *Y10T 137/0525* (2015.04); *Y10T 137/6031* (2015.04); *Y10T 137/6058* (2015.04)

(58) Field of Classification Search
CPC .... F16K 5/0242; F16K 5/0442; F16K 5/0642; F16K 5/0652; F16K 31/502; F16K 31/508; F16K 31/521; F16K 31/522; F16K 31/50; F16K 31/44; F16K 31/05; F16K 31/055; F16K 27/06; F16K 27/062; F16K 27/065; F16K 27/067; F16K 27/0209; F16K 27/0218; F16K 27/0227; Y10T 137/0508; Y10T 137/0519; Y10T 137/0525; Y10T 137/0491; Y10T 137/6028; Y10T 137/6031; Y10T 137/6035; Y10T 137/6048; Y10T 137/6058; Y10T 137/7065
See application file for complete search history.

(56) References Cited

U.S. PATENT DOCUMENTS

| 1,908,763 | A | * | 5/1933 | Kelty | F16K 31/05 |
| | | | | | 137/552 |
| 5,588,637 | A | * | 12/1996 | Carsten | F16K 31/05 |
| | | | | | 251/129.03 |
| 2017/0350525 | A1 | * | 12/2017 | Scaramucci | F16K 5/0647 |

FOREIGN PATENT DOCUMENTS

GB 1046634 A * 10/1966 ........... F16K 31/055

* cited by examiner

*Primary Examiner* — Mary E McManmon
*Assistant Examiner* — Hailey K. Do
(74) *Attorney, Agent, or Firm* — Glenn H. Lenzen; Dietze and Davis, P.C.

(57) ABSTRACT

A valve assembly including a valve having an opening and closing mechanism for controlling the flow of a fluid through the valve controlled by an actuator and an actuator mounting bracket secured to the valve. The actuator mounting bracket includes upper and lower clamps securing the valve actuator to the valve regardless of the valve position.

7 Claims, 5 Drawing Sheets

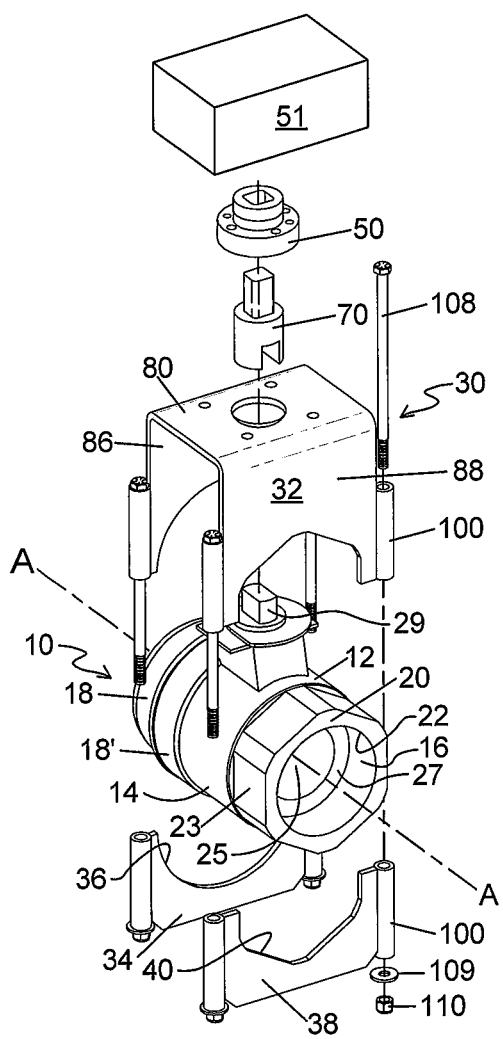
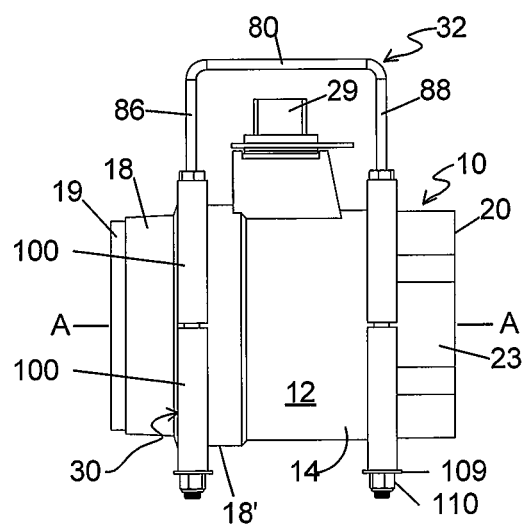
Fig. 1.A.
Fig. 1.B.

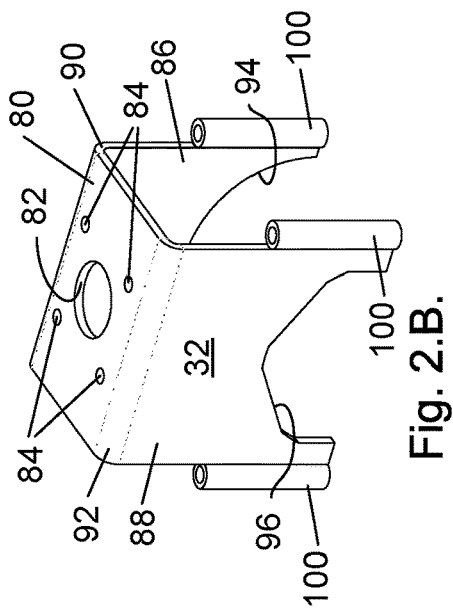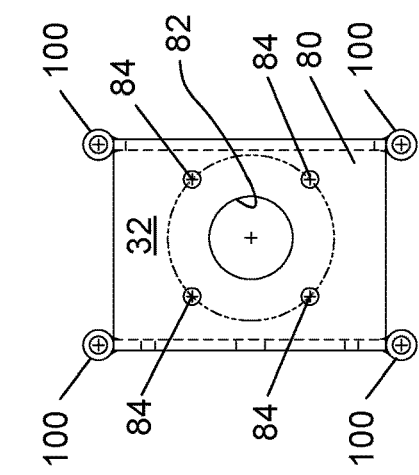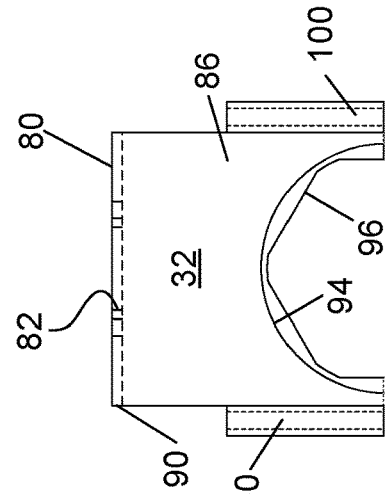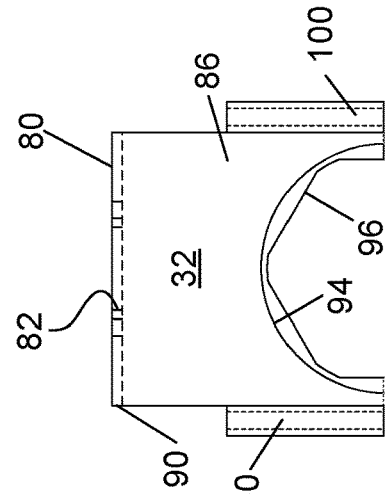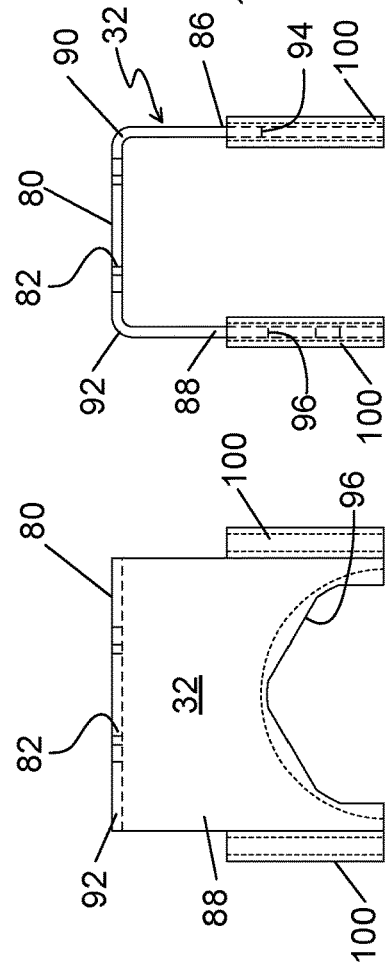

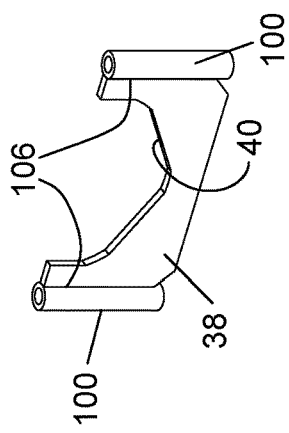
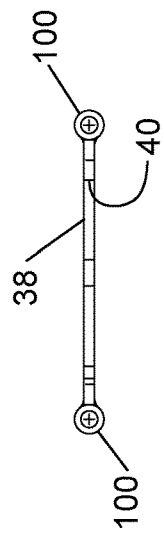
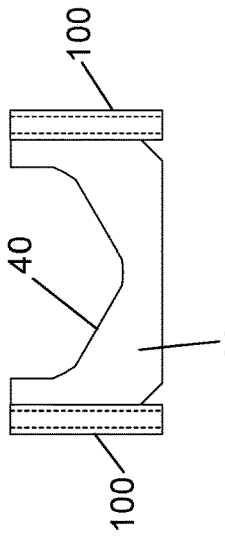
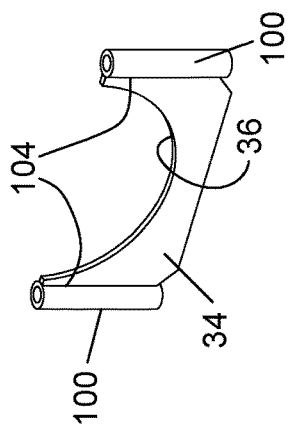
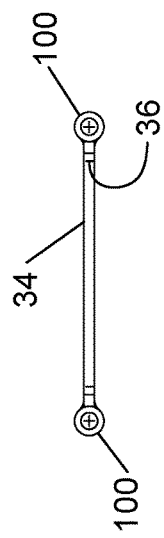
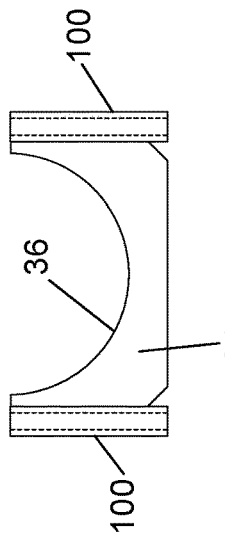
Fig. 4.C.
Fig. 4.A.
Fig. 4.B.
Fig. 3.C.
Fig. 3.A.
Fig. 3.B.

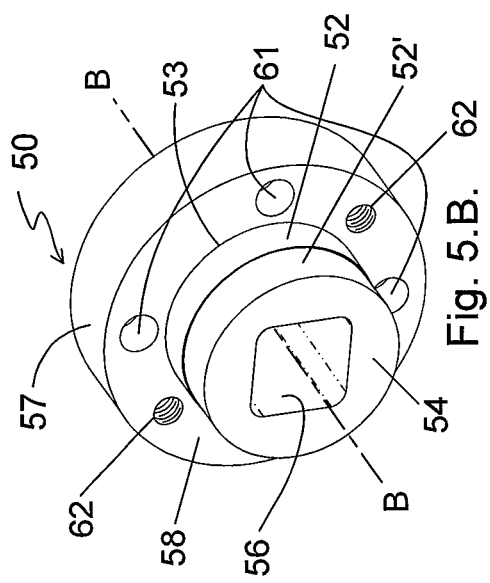
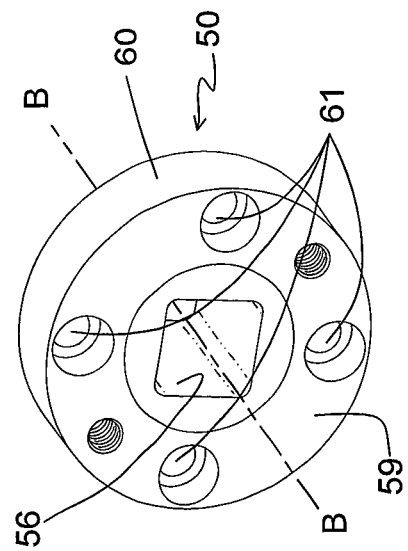
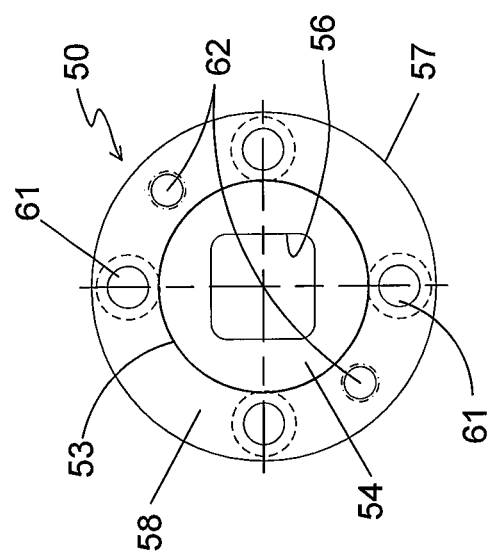
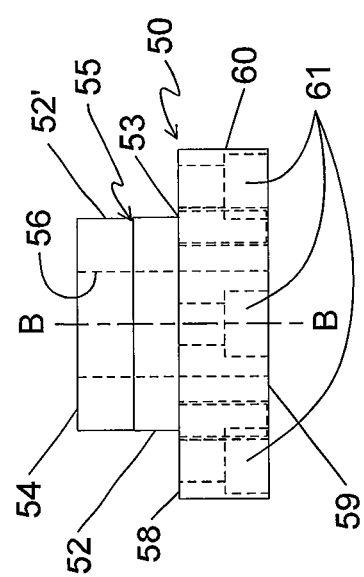
Fig. 5.A.
Fig. 5.B.
Fig. 5.C.
Fig. 5.D.

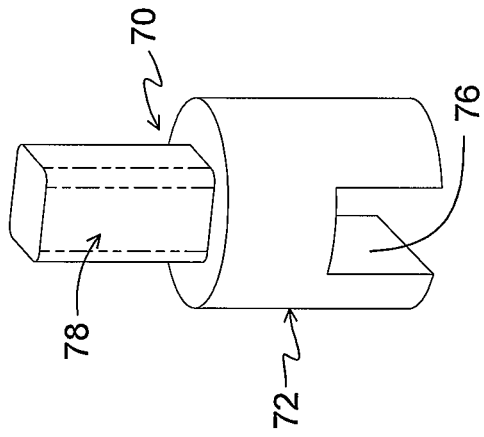
Fig. 6.A.
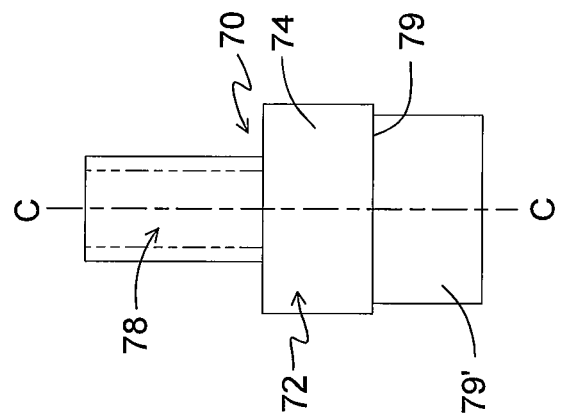
Fig. 6.B.
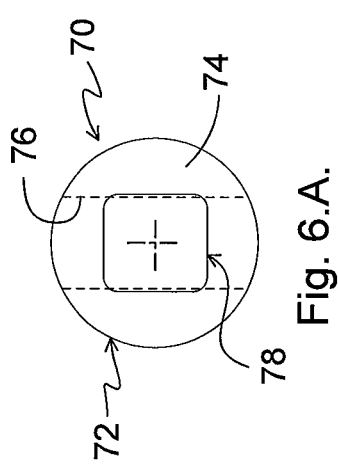
Fig. 6.C.
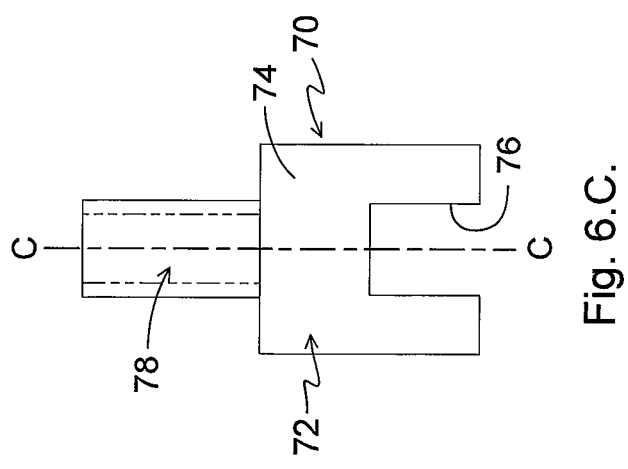
Fig. 6.D.

VALVE ASSEMBLY

CROSS-REFERENCE TO RELATED APPLICATIONS

This application claims the benefit of U.S. Provisional Patent Application Ser. No. 62/347,918, filed on Jun. 9, 2016, and entitled Valve Actuator Mounting Bracket, the entire disclosure of which is incorporated herein by reference.

FIELD OF THE INVENTION

This invention relates generally to valve assemblies and, particularly, to valve assemblies including an actuator mounting bracket structure for securing an actuator to a valve. More specifically, the present invention relates to a valve assembly having an actuator mounting bracket structure for securing an actuator to a valve to facilitate remote opening and closing of the valve by means of an automated control system.

BACKGROUND OF THE INVENTION

Pressurized containers, for example, cylinders containing industrial gases such as oxygen, nitrogen, carbon dioxide, and so forth for use in manufacturing applications; fluid transportation piping systems; and regulatory or control systems, both hydraulic and pneumatic, typically employ valve mechanisms to selectively control or regulate the flow of fluids or gases within the system. Often, such fluids or gases are stored and transported under pressure, as is the case in the oil and gas industry, where energy products are processed and transported in complex refinery and pipeline systems. These systems require precise regulation of the product flow throughout the entire system, and sophisticated automatic electronic, hydraulic and pneumatic control systems have been developed to manage this formidable task.

Key elements of the foregoing complex manufacturing, transport and control systems are the valves which physically manage the flow of fluid from point to point within a system. Valves may be characterized as either being manually actuated via a handle, lever or wrench, or via an actuator, which may be electrically, pneumatically or hydraulically controlled. In the case of a manufacturing and transportation piping systems, by way of example, heavy duty valve mechanisms, for example, ball valves, control the flow of product from its initial point of extraction from the earth to refineries for further processing and then on to market. Automated control systems, in turn, make use of either electrical signals, or, in the case of hydraulic control systems, incompressible fluids, to selectively control actuators for opening, closing and throttling fluid flow through valve systems, thus eliminating the need to operate valves manually on-site on an individual basis.

While seemingly simple in concept, in practice, securing an actuator to a valve for remote automatic operation can present unanticipated difficulties that may not be overcome by the use of conventional actuator mounting methods. For example, valve body configurations and external dimensions vary from manufacturer to manufacturer, and although certain actuator mounts may be used in connection with valves from various sources, many manufacturers have not designed nor do they offer actuator mounting devices for their specific valve product lines. Moreover, no manufacturer offers an actuator mounting system commercially for general use, and attempts by various valve system designers and end users to clamp or otherwise secure actuators in various positions to valve bodies have not proven satisfactory.

In view of the foregoing, it is apparent that a need exists for a new and useful valve assembly having an improved mounting bracket which permits mounting of an actuator mechanism on a valve to permit remote opening, closing and regulation of the valve by an automated control system.

SUMMARY OF THE INVENTION

In order to achieve above-referenced technological advances, the present invention provides a valve assembly including a valve, a valve actuator mounting bracket apparatus or system which precisely and securely locates a valve actuator in operative engagement with the operating elements of the valve, regardless of the valve's orientation with respect to the horizontal.

In one embodiment, the present invention provides a valve assembly including a valve having a valve body, a valve actuator mounting bracket which is structured and arranged to reflect the mirror image of the valve body's external dimensions, whereby precise operating engagement of the respective operating elements of the actuator and the valve are maintained.

In yet another embodiment, a valve actuator mounting bracket is provided which includes structural elements that accommodate three axis misalignments between the respective operating elements of an actuator and a valve while at the same time maintaining precise operating engagement thereof.

In still another embodiment, a valve actuator mounting bracket is provided which includes a drive adaptor and drive coupling system adapted to transfer rotational forces generated by an actuator to a valve via a valve stem.

These and other features, aspects and advantages of the present invention will be apparent from the accompanying detailed disruption of the invention, which, taken with the appended drawings, discloses the embodiment thereof.

BRIEF DESCRIPTION OF THE DRAWINGS

Referring now to the attached drawings which form a part of this original disclosure:

FIG. 1.A. is an exploded side perspective view of a valve assembly including a valve actuator mounting bracket apparatus and associated exemplary valve on which the actuator is mounted;

FIG. 1.B is a side elevation view of the valve assembly illustrated in FIG. 1.A.;

FIG. 2.A. is a top plan view of an upper clamp portion of a valve actuator mounting bracket apparatus;

FIG. 2.B. is a side perspective view of the upper clamp portion of a valve actuator mounting bracket apparatus show in FIG. 2.A.;

FIG. 2.C. is a right side elevation view of the upper clamp portion of the valve actuator mounting bracket shown in FIGS. 2.A. and 2.B.;

FIG. 2.D. is an end view of the upper clamp portion of the valve actuator mounting bracket shown in FIGS. 2.A., 2.B. and 2.C.;

FIG. 2.E. is a left side elevation view of the upper clamp portion of the valve actuator mounting bracket shown in FIGS. 2.A., 2.B., 2.C. and 2.D.;

FIG. 3.A. is a top plan view of a first lower clamp portion of a valve actuator mounting bracket apparatus;

FIG. 3.B. is a side elevation view of the first lower clamp portion of a valve actuator mounting bracket apparatus shown in FIG. 3.A.;

FIG. 3.C. is a side perspective view of the first lower clamp portion of the valve actuator mounting bracket shown in FIGS. 3.A. and 3.B.;

FIG. 4.A. is a top plan view of a second lower clamp portion of a valve actuator mounting bracket apparatus;

FIG. 4.B. is a side elevation view of the second lower clamp portion of a valve actuator mounting bracket apparatus shown in FIG. 4.A.;

FIG. 4.C. is a side perspective view of the second lower clamp portion of the valve actuator mounting bracket shown in FIGS. 4.A. and 4.B.;

FIG. 5.A is a top plan view of an actuator drive adaptor;

FIG. 5.B. is a side perspective view of the actuator drive adaptor shown in FIG. 5.A.;

FIG. 5.C. is a side elevation view of the actuator drive adaptor shown in FIGS. 5.A. and 5.B.;

FIG. 5.D. is a side elevation view of the opposite side of the actuator drive adaptor shown in FIG. 5.A.;

FIG. 6.A. is a top plan view of an actuator drive coupler;

FIG. 6.B. is a side perspective view of the actuator drive coupler shown in FIG. 6.A.;

FIG. 6.C. is a side elevation view of the actuator drive coupler shown in FIGS. 6.A. and 6.B.; and FIG. 6.D. is a side elevation view of another embodiment of an the actuator drive coupler.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring now to FIGS. 1.A. and 1.B., a valve assembly is shown generally at 10. The assembly includes a valve 12 and a valve actuator mounting bracket apparatus depicted generally at 30. The valve 12, by way of example and not of limitation, is a floating ball valve such as manufactured by Balon Corporation of Oklahoma City, Okla.; however, it is to be understood that valves of various configurations and sources may be used in connection with the valve actuator mounting bracket apparatus of the present invention without departing from the scope thereof.

The valve 12 includes an elongate body portion 14 (valve body) having an elongate shape extending generally circumferentially about and along a longitudinal axis A-A; the body portion defining a longitudinally extending cavity 16 adapted to receive fluids in a pipeline system (not shown) in which the valve may be installed to regulate the flow of fluids therein. The body portion 14, typically a machined steel or iron casting, may include, for example, a tapered first end portion 18 having male threads 19 formed thereon for threadably securing the first end of the valve to a mating female coupling on an end of a pipe in the pipeline system. The body includes a generally cylindrical portion 18' formed therein adjacent the tapered end, the cylindrical portion being adapted to fit with portions of a valve actuator mounting bracket apparatus, as will be described in greater detail below. The valve body also includes a second end portion 20 having female threads 22 formed therein adapted to threadably secure the second end of the valve to a male threaded portion of another pipe in the pipeline system and to serve as a reference point for alignment of a valve stem 29. The second end 20 is shown in the configuration of a hexagonally shaped nut or fastener 23 adapted to receive a wrench or other suitable fastening tool thereon to enable the valve to be secured to an end of an adjoining pipe. It is to be understood, however, that valves having other shapes and configurations may be used without departing from the scope of the present invention.

As best viewed in FIG. 1.A., the valve further includes a valve opening and closing mechanism, by way of example and not of limitation, a ball 25 rotatably positioned in sealing engagement with a mating seat 27 within the valve body 14. The valve stem 29, extending outwardly through a suitable aperture formed in the valve body in a direction substantially transverse to the axis A-A, is operatively connected to the ball 25. Rotation of the stem in either direction translates into rotational movement of the ball within the valve body, whereby fluid flow through a portion of the pipeline system in which the valve is positioned may be selectively controlled by opening or closing the valve 12, as will be described in greater detail below.

The valve actuator mounting bracket apparatus 30 is shown secured to the valve 12 in FIG. 1.B and depicted in an exploded view in FIG. 1.A. to more clearly illustrate the elements thereof. The apparatus 30 includes an upper clamp 32; a first lower clamp 34 releaseably secured to the upper clamp and having a body portion including a semi-cylindrically-shaped upper surface 36 formed therein which conforms in shape and dimension to the cylindrical portion 18' of the valve body and is adapted to be secured in mating engagement with the first end. The apparatus 30 further includes a second lower clamp 38 releaseably secured to the upper clamp and having a body portion including a half-hexagonally-shaped upper surface 40 formed therein which conforms in shape and dimension to the second end portion 20 of the valve body and is adapted to be secured in mating engagement with the second end. While the shapes of the upper surfaces of the lower clamps 34 and 38 have been described as semi-cylindrical and half-hexagonal respectively, as noted above, it is to be understood that upper surfaces of various shapes conforming to the mating surfaces of valve bodies of various configurations may be employed without departing from the scope of the instant invention.

Referring back to FIG. 1.A. and as shown in greater detail in FIGS. 5.A.-5.D., the actuator mounting bracket apparatus 30 further includes an actuator drive adaptor 50 structured and arranged to be secured to the upper clamp 32, whereby a valve actuator 51, via the actuator mounting bracket apparatus 30, may be operatively connected to or coupled with the valve opening and closing mechanism. The adapter 50 includes a cylindrically shaped body portion 52 extending along a central axis B-B, the body including a first end 53, a second end 54, and outer surface 55 extending circumferentially about the axis B-B intermediate the ends and an aperture 56 formed therein, the aperture also extending intermediate the ends coaxially through the body portion along axis B-B. The body includes a stepped portion 52' which is slightly smaller in circumferential size than body portion 52 to prevent binding with a mating cavity (not shown) on the valve actuator 51.

A flange member having a generally cylindrically shaped body 57 is rotatably connected to the first end 53 of adapter body 52, as is known in the art. The generally cylindrically shaped body portion 57 of the flange is defined by a first or top surface 58, a second or bottom surface 59, and an outer surface 60 extending circumferentially about axis B-B intermediate the top and bottom surfaces 58 and 59. The aperture 56 extends through the flange along the axis B-B. A plurality of apertures or holes 61 are formed in the flange body 57 for receiving fasteners for securing the flange and the drive adaptor to the upper clamp 32, as will be described in greater detail below. A plurality of threaded apertures 62 are formed in the flange body 57, each of the plurality of threaded apertures being structured to receive a bolt or other threaded member for extraction/removal of the adapter from the valve assembly. The second end portion 54 of the actuator drive adapter 50 is structured and arranged to be in operative supporting engagement with the valve actuator.

Directing the reader's attention now to FIGS. 6.A.-6.D., the elements of an actuator coupler 70 are illustrated. The coupler 70 is located intermediate and is structured and arranged to operatively interconnect a valve actuator and the valve stem 29. It includes a stepped elongate body member 72 extending uniformly equidistantly about and along longitudinal axis C-C. In the embodiment of FIGS. 6.A., 6.B. and 6.C., the stepped body member 72 comprises a cylindrical lower body portion 74 adapted to be received in aperture 82 as described in greater detail below. The lower body 74 has a slotted aperture 76 extending transversely there through which is adapted to fit over and operatively engage valve stem 29. In the embodiment of FIG. 6.D., the cylindrical lower body portion also includes a shoulder 79 which is configured to rest in rotational engagement with and upon the upper clamp 32. The shoulder 79 has a cylindrically shaped lower body portion 79' extending longitudinally downwardly therefrom which is circumferentially smaller in size than body portion 74. Both embodiments further include an upper body portion 78 having a mirror image shape and configuration of the aperture 56 formed in the drive adaptor 50 and structured and arranged to be slideably received therein. In operation, rotational forces generated by a valve actuator 51 in response to signals from an automated control system are transferred via the drive adaptor to the valve coupler and valve stem and then to the ball 25 in the valve. The valve 12 thus may be controlled remotely to be in an open, partially open or fully closed position.

Referring now to FIGS. 2.A. through 2.E., the features of the upper clamp 32 are described in greater detail. Upper clamp 32 comprises a generally flat, rectangular-shaped member or plate 80 which, when secured in position on valve 12, lies in a plane which is substantially parallel to axis A-A. Plate 80 has a generally centrally located aperture 82 formed therein which is adapted to rotatably receive the actuator valve coupler 70. A plurality of smaller apertures 84 are also formed in plate 80 and are uniformly and equidistantly positioned therein about aperture 82 so as to be in operative alignment with the corresponding apertures 61 formed in flange member 57 for receiving fasteners for securing the flange and the drive adaptor to the upper clamp 32.

The upper clamp 32 further includes a pair of juxtaposed legs 86, 88 of substantially equal length and extending in a direction substantially perpendicular to the plane of the plate member from first and second opposite long edges 90, 92 respectively of the plate 80. Leg 86 includes a semi-cylindrically-shaped lower surface 94 formed therein which conforms in shape and dimension to the cylindrical portion 18' of the valve body and is adapted to be secured in mating engagement therewith. Leg 88 includes a half-hexagonally-shaped lower surface 96 formed therein which conforms in shape and dimension to the second end portion 20 of the valve body and is adapted to be secured in mating engagement therewith. Legs 86 and 88 cooperate with lower clamps 36 and 38 respectively to circumferentially encapsulate the valve body 14 in relatively rigid clamping engagement, whereby an actuator is secured in position with respect to and operatively connected to the valve stem 29 irrespective of the relative position thereof with respect to the horizontal.

The upper and lower clamps 32, 34 and 38 of the actuator mounting bracket apparatus may be releaseably secured together as shown in FIGS. 1.A. and 1.B. As depicted in FIG. 5.A. a plurality of generally cylindrical sleeve members 100 are each attached to the upper clamps, 32 for example by welding to each of a lower edge portion 102 of legs 86, 88 of the upper clamp and corresponding upper edge portions 104, 106 of lower clamps 36 and 38, respectively. When the above-referenced components of the actuator mounting bracket apparatus are positioned in operative alignment on a valve (as shown in FIGS. 1.A. and 1.B.), suitable fasteners such as elongated bolts 108 may be inserted into aligned sleeve members 100 and secured firmly in place by threaded fasteners such as cooperating flat washer and lock nuts 109 and 110.

Changes may be made in the above methods and systems without departing from the scope hereof. It should be noted that the matter contained in the above description and/or shown in the accompanying figures should be interpreted as illustrative and not in a limiting sense. The following claims are intended to cover all generic and specific features described herein, as well as all statements of the scope of the present systems and methods, which, as a matter of language, might be said to fall there between.

What is claimed is:

1. A valve assembly comprising:
a valve having a valve body, the valve body including an elongate shape extending circumferentially about and along a longitudinal axis, a first end portion having a first shape and a second end portion having a second shape the valve having an orientation with respect to the longitudinal axis;
an opening and closing mechanism positioned in the valve body, the opening and closing mechanism being adapted to selectively control flow of a fluid through the valve;
a valve stem secured to the opening and closing mechanism;
a valve actuator mounting bracket operatively connected to the valve, the valve actuator mounting bracket including an upper clamp, the upper clamp further including a flat rectangular-shaped plate member adapted to be positioned in a plane which is substantially parallel to the longitudinal axis of the elongate body portion of the valve, and a pair of juxtaposed legs of substantially equal length extending in a direction substantially perpendicular to the plane of the plate member from first and second opposite long edges of the plate member, one of the pair of juxtaposed legs having a lower surface formed therein which is shaped to conform to the shape of the first end portion of the valve body and the other of the pair of juxtaposed legs having a lower surface formed therein which is shaped to conform to the shape of the second end portion of the valve body and first and second lower clamps, each of the first and second lower clamps being adapted to be releasably secured to the upper clamp, wherein the first lower clamp includes a body portion having an upper surface formed therein which is shaped to conform to the shape of the first end portion of the valve body and wherein the second lower clamp includes a body portion having an upper surface formed therein which is shaped to conform to the shape of the second end portion of the valve body;

an actuator drive adaptor secured to the upper clamp, the actuator drive adaptor including a cylindrically-shaped body portion extending along a central axis, the cylindrically-shaped body portion having an aperture formed therein and extending coaxially therethrough, a first end having a flange member connected thereto, the flange member being adapted to be secured to the upper clamp and including a plurality of apertures formed therein, each of the plurality of apertures being adapted to receive a fastener for securing the flange member and the drive adaptor to the upper clamp, and a second end adapted to be operatively connected to the valve actuator; and an actuator coupler located intermediate a valve actuator and the opening and closing mechanism, the actuator coupler being adapted to operatively interconnect the valve actuator to the opening and closing mechanism irrespective of the valve's orientating with respect to the longitudinal axis.

2. The valve assembly of claim 1 wherein the actuator coupler includes a stepped elongate body member extending uniformly equidistantly about and along a longitudinal axis, the stepped body member including a cylindrical lower body portion having a slotted aperture extending therethrough in a direction transverse to the longitudinal axis, the slotted aperture being adapted to fit over and operatively engage the valve stem.

3. The valve assembly of claim 2 wherein the actuator coupler further includes an upper body portion having a mirror image of the aperture formed in the actuator drive adaptor.

4. The valve assembly of claim 2 wherein the cylindrical lower body portion further includes a shoulder, the shoulder being adapted to rest in rotational engagement with and upon the upper clamp.

5. The valve assembly of claim 4 wherein the actuator coupler further includes an upper body portion having a mirror image of the aperture formed in the actuator drive adaptor.

6. The valve assembly of claim 1 wherein the first end portion is cylindrically shaped and wherein the second end portion is hexagonally shaped.

7. The valve assembly of claim 6 wherein the second end of the valve body is a reference point for alignment of the valve stem.

* * * * *